United States Patent
Corey et al.

(10) Patent No.: US 6,866,952 B2
(45) Date of Patent: Mar. 15, 2005

(54) APPARATUS AND METHOD FOR CONTROLLING UNDESIRED WATER AND FUEL TRANSPORT IN A FUEL CELL

(75) Inventors: John A. Corey, Melrose, NY (US); Gerbard Beckmann, Altamont, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 95 days.

(21) Appl. No.: 09/837,834

(22) Filed: Apr. 18, 2001

(65) Prior Publication Data

US 2002/0155334 A1 Oct. 24, 2002

(51) Int. Cl.$^7$ .............................................. H01M 8/02
(52) U.S. Cl. .............................. 429/19; 429/30; 429/33
(58) Field of Search ................................ 429/19, 30, 33

(56) References Cited

U.S. PATENT DOCUMENTS

| | | | |
|---|---|---|---|
| 4,593,534 A | 6/1986 | Bloomfield | |
| 4,673,624 A | 6/1987 | Hockaday | 429/41 |
| 4,810,597 A | 3/1989 | Kumagai et al. | 429/22 |
| 5,523,177 A | 6/1996 | Kosek et al. | 429/40 |
| 5,573,866 A | 11/1996 | Van dine et al. | 429/13 |
| 5,599,638 A | 2/1997 | Surampudi et al. | 429/33 |
| 5,631,099 A | 5/1997 | Hockaday | 429/30 |
| 5,723,228 A | 3/1998 | Okamoto | 429/12 |
| 5,759,712 A | 6/1998 | Hockaday | 429/30 |
| 5,766,786 A | 6/1998 | Fleck et al. | 429/17 |
| 5,773,162 A | 6/1998 | Surampudi et al. | 429/39 |
| 5,795,668 A * | 8/1998 | Banerjee | 429/33 |
| 5,916,699 A | 6/1999 | Thomas et al. | 429/3 |
| 5,945,231 A | 8/1999 | Narayanan et al. | 429/30 |
| 5,992,008 A | 11/1999 | Kindler | 29/730 |
| 6,068,941 A | 5/2000 | Fuller et al. | 429/13 |
| 6,103,410 A | 8/2000 | Fuller et al. | 429/13 |
| 6,130,175 A * | 10/2000 | Rusch et al. | 442/77 |
| 6,296,964 B1 | 10/2001 | Ren et al. | |
| RE37,656 E * | 4/2002 | Bahar et al. | 204/282 |
| 6,383,670 B1 | 5/2002 | Edlund et al. | |

OTHER PUBLICATIONS

"Pocket–Size PEMs", Paul Sharke, Mechanical Engineering, Downloaded from Http://www.memagazine.org/contents/current/features/pems/pems.html on Jul. 25, 2000.

Ren et al., Methanol Cross–Over in Direct Methanol Fuel Cells, Electronic and Electrochemical Materials and Devices MST–11, MS–D429, Los Alamos National Library, Oct. 1995.

Ren et al., Methanol Cross–Over in Direct Methanol Fuel Cells, Electronic and Electrochemical Materials and Devices MST–11, MS–D429, Los Alamos National Library.

"Polymer Electrolyte Fuel Cells as Potential Power Sources for Portable Electronic Devices", Shimshon Gottesfeld and Mahlon S. Wilson, pp. 487–517.

"Fuel Cell", 1992 Fuel Cell Seminar, Program and Abstracts, pp. 233–236, 461–464, no month.

"Miniaturized Fuel Cells for Portable Power", Helen L. Maynard and Jeremy P. Meyers, Lucent Technologies, 2000, no month.

"Pocket–size PEMs", Paul Sharke, Mechanical Engineering.

\* cited by examiner

*Primary Examiner*—Carol Chaney
(74) *Attorney, Agent, or Firm*—Cesari and McKenna, LLP; Rita M. Rooney, Esq.

(57) ABSTRACT

A layered membrane or membrane electrode assembly for use with a direct oxidation fuel cell provides reduced water carryover and fuel crossover while maintaining a high total protonic exchange between anode and cathode. A layer of material which is substantially impermeable to water and fuel, but which is foraminous to allow contact between adjacent protonically conductive layers, is used to significantly increase the system's carryover resistance while only modestly increasing the total reaction resistance.

23 Claims, 6 Drawing Sheets

APPARATUS AND METHOD FOR CONTROLLING UNDESIRED WATER AND FUEL TRANSPORT IN A FUEL CELL

BACKGROUND OF THE INVENTION

1. Field of the Invention

The present invention relates generally to the field of fuel cells and, more specifically, to a membrane for controlling water and fuel carryover in a direct oxidation fuel cell.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel systems may be divided into "reformer-based" (i.e., those in which the fuel is processed in some fashion before it is introduced into the cell) or "direct oxidation" in which the fuel is fed directly into the cell without internal processing. Most currently available fuel cells are of the reformer-based type, but fuel-processing requirements for such cells limits the applicability of those cells to relatively large systems.

Direct oxidation fuel cell systems may be better suited for a number of applications such as smaller mobile devices (i.e., mobile phones, handheld and laptop computers), as well as in larger applications. One example of a direct oxidation system is the direct methanol fuel cell system or DMFC. In a DMFC, the electrochemical reaction at the anode is a conversion of methanol and water to $CO_2$, $H^+$ and $e^-$. More specifically, a liquid carbonaceous solution (typically aqueous methanol) is applied to a protonically-conductive (but, electronically non-conductive) membrane (PCM) directly using a catalyst on the membrane surface to enable direct oxidation of the hydrocarbon on the anode. The hydrogen protons are separated from the electrons and the protons pass through the PCM, which is impermeable to the electrons. The electrons thus seek a different path to reunite with the protons and travel through a load, providing electrical power.

The carbon dioxide, which is essentially a waste product, is separated from the remaining methanol fuel mixture before such fuel is re-circulated. In an alternative usage of the carbon dioxide this gas can be used to passively pump liquid methanol into the feed fuel cell. This is disclosed in U.S. patent application Ser. No. 09/717,754, filed on Dec. 8, 2000, for a PASSIVELY PUMPED LIQUID FEED FUEL CELL SYSTEM, which is commonly owned by the assignee of the present invention, and which is incorporated by reference herein in its entirety.

Fuel cells have been the subject of intensified recent development because of their high energy density in generating electric power from fuels. This has many benefits in terms of both operating costs and environmental concerns. Adaptation of such cells to mobile uses, however, is not straightforward because of technical difficulties associated with reforming carbonaceous fuels in a simple and cost effective manner, and within acceptable form factors and volume limits. Further, a safe and efficient storage means for hydrogen fuel gas (or hydrogen fuel gas reformats) a challenge because hydrogen gas must be stored at high pressure and at cryogenic temperatures or in heavy absorption matrices in order to achieve useful energy densities. It has been found, however, that a compact means for storing hydrogen is in a hydrogen rich compound with relatively weak chemical bonds, such as methanol (and to a lesser extent, ethanol, propane, butane and other carbonaceous liquids). Thus, efforts to develop the DMFC commercially have increased over the past several years.

Even in a DMFC, however, the stored reactants may constitute a significant portion of the total of the volume of the system, thus creating a need to store the fuel in undiluted form even though an aqueous solution may be preferable when the fuel is actually presented to the membrane for reaction. For example, some current generation DMFCs operate on an aqueous solution that is 3% methanol. This implies that water must be added to the undiluted fuel between the fuel source and the reactive site on the anode side of the PCM. As water is a product of the reaction, it is possible to supply a large portion of such water from reaction products at the cathode.

Unfortunately, known protonically-conductive membrane materials exhibit an undesirable characteristic. Specifically, water and some fuel and water molecules are carried from the anode to the cathode through the PCM in addition to the transferred protons. Fuel is primarily lost due to a phenomenon known as "methanol crossover," which is caused by the fact that most currently available membranes allow fuel to pass through the PCM from the anode to the cathode and oxidized there without generating electricity. The lost fuel reduces the efficiency of the cell. In addition, as protons migrate through the membrane, they carry molecules of water through the PCM as well, a characteristic known as "water carryover." The water that carries through the PCM may be far in excess of that generated by the recombination on the cathode. While this problem might be addressed by either return pumping of larger volumes of water, or excessive dilution of the stored fuel to maintain adequate dilution of the fuel at the anode, each of those approaches has clear disadvantages. What is needed is an improved membrane to limit water carryover especially, as well as methanol crossover fuel loss too, without equivalent reduction in total protonic exchange.

SUMMARY OF THE INVENTION

In brief summary, the present invention provides a layered membrane and membrane-electrode assembly which supports a high level of total protonic exchange in a direct oxidation fuel cell, yet significantly reduces carryover of water and fuel crossover. The present invention employs a "barrier" material which is substantially impermeable to water and fuel, but which allows protons to pass through it. The barrier material, while introducing a modest increase in the reaction resistance of the fuel cell, provides a resistance to carryover of fuel and water several times greater than that of a conventional proton conducting membrane (PCM). As a result, the "loss" due to the increased reaction resistance is more than offset by the substantially reduced carryover of water and fuel. In addition, the present invention enables a direct oxidation fuel cell to operate with a higher fuel concentration.

In a preferred embodiment, a layer of impermeable material, such as polyester having pores of a preferred size, is sandwiched between two layers of PCM to form the layered membrane. The layered membrane is, in turn, sandwiched between two layers of catalyst. Layers of diffusion material are disposed on the surfaces of the catalyst layers which are not in contact with the PCM layers, thereby forming a membrane electrode assembly (MEA) which may be used with a direct oxidation fuel cell such as a DMFC.

BRIEF DESCRIPTION OF THE DRAWINGS

The invention description below refers to the accompanying drawings, of which.

DETAILED DESCRIPTION OF AN ILLUSTRATIVE EMBODIMENT

For purposes of illustration, we herein describe an illustrative embodiment of the invention as it is employed in connection with a DMFC, with the fuel substance being methanol or an aqueous methanol solution. It should be understood, however, that it is within the scope of the present invention that the layered membrane or membrane electrode assembly can be readily used for other fuels in direct oxidation fuel cells. Thus, as used herein, the word "fuel" shall include methanol, ethanol, propane, butane or combinations thereof, and aqueous solutions thereof and other carbonaceous fuels amenable to use in a direct oxidation fuel cell system.

Figure 1:
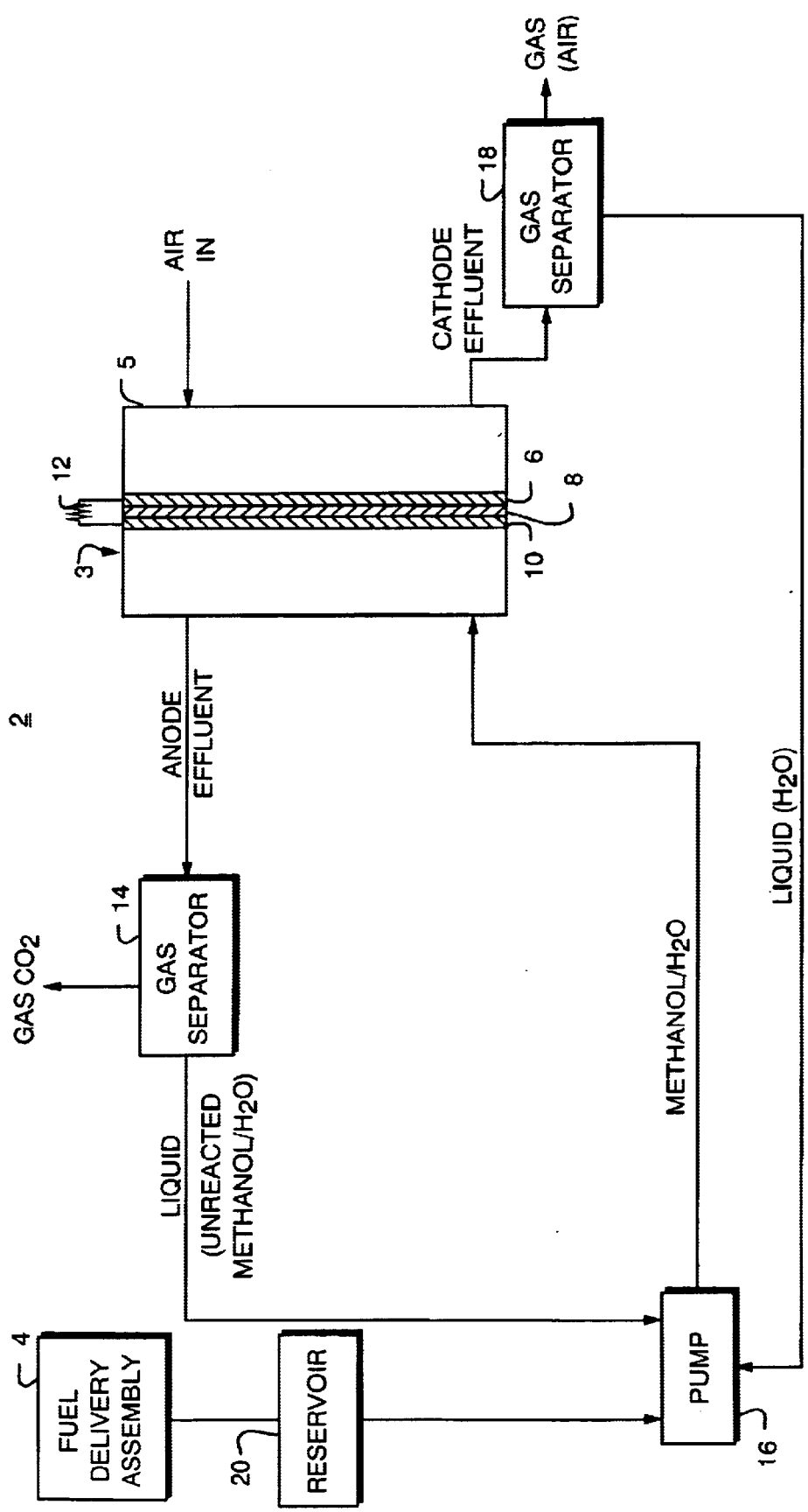
FIG. 1 is a block diagram of a direct methanol fuel cell system with which the present invention may be employed.

FIG. 1 shows a direct methanol fuel cell system 2. For a better understanding of the present invention, the system 2 will be briefly described. The system 2 contains a direct methanol fuel cell (DMFC) 3 and a fuel delivery assembly 4. The direct methanol fuel cell 3 includes a housing 5 which encloses a cathode 6, a protonically conductive, electronically non-conductive membrane (PCM) 8 and an anode 10.

Methanol or a solution of methanol and water is introduced to the anode side of housing 5 while oxygen is introduced into the cathode side of the housing 5. The source of the oxygen is preferably ambient air but it should be understood that other sources could be used. As a result of the reactions at the anode and cathode, free electrons flow from the anode 10 through a load 12 to cathode 6, while hydrogen ions flow from anode 10 through PCM 8 to cathode 6. So long as the chemical reactions continue, a current is maintained through load 12.

Fuel from fuel delivery assembly 4 may be used to fill a reservoir 20, from which the fuel may be subsequently drawn. Alternatively, fuel may be supplied directly to pump 16, in which case reservoir 20 is not needed. Pump 16 is coupled to a first gas separator 14, and to DMFC 3, as well as to gas separator 18. The first gas separator 14 receives effluent from the anode 10 of the fuel cell 3 and separates it into liquid (i.e., unreacted methanol or methanol and water) and carbon dioxide. The liquid component is supplied to pump 16 for recirculation to DMFC 3. Pump 16 creates suction to draw fuel from the fuel delivery system 4. The gas component may also be supplied to pump 16 and may be used to drive the pump in accordance with the teachings of commonly-owned U.S. patent application Ser. No. 09/717,754.

Figure 2:
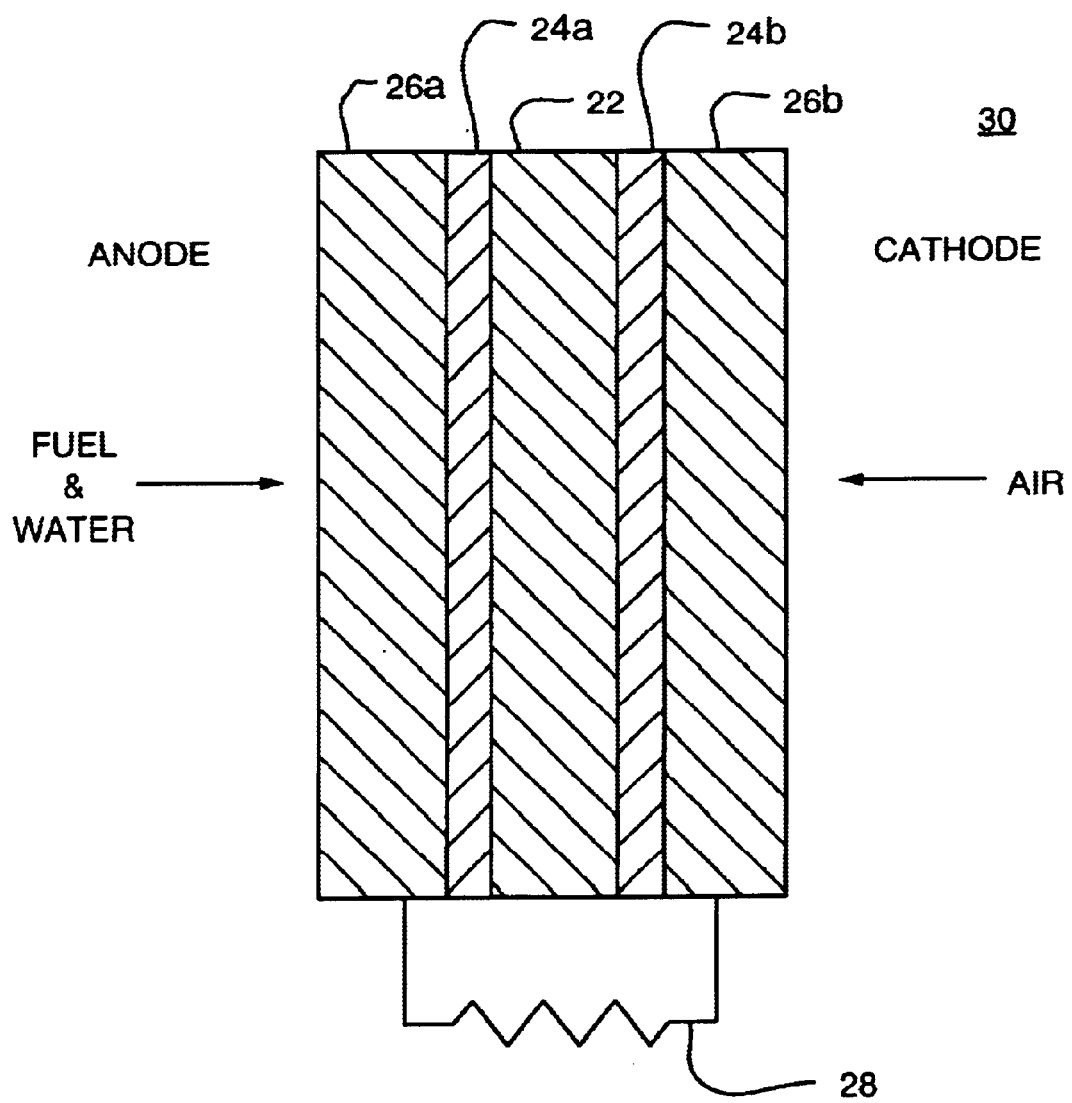
FIG. 2 is a cross-section of a membrane electrode assembly known in the prior art.

FIG. 2 shows, in cross-section, a membrane electrode assembly (MEA) 30 known in the prior art. A PCM 22 is sandwiched between layers of catalyst 24a and 24b. Electrically conductive diffusion layers 26a and 26b are disposed, respectively, on the surfaces of catalysts 24a, 24b that are not in contact with PCM 22. A load 28 is connected between the anode and cathode.

PCM 22 is typically constructed from a commercially available materials including those sold by E. I. DuPont de Nemours and Company under the trademark Nafion®. Catalysts 24a, 24b are constructed from a material appropriate for the type of fuel to be used (e.g., in the case of a DMFC, typically platinum and/or a platinum-ruthenium blend), while diffusion layers 26a, 26b are typically constructed using thin film techniques.

In MEA 30, diffusion occurs at both anode and cathode which causes, in the first instance, fuel molecules at the anode to move to active reaction sites on the surfaces of PCM 22. Subsequently, after protons cross PCM 22, diffusion brings oxygen atoms to active reaction sites on the cathode side of the PCM. In addition, there is a reaction activation step at the electrodes, which is facilitated by catalysts 24a, 24b.

Figure 3:
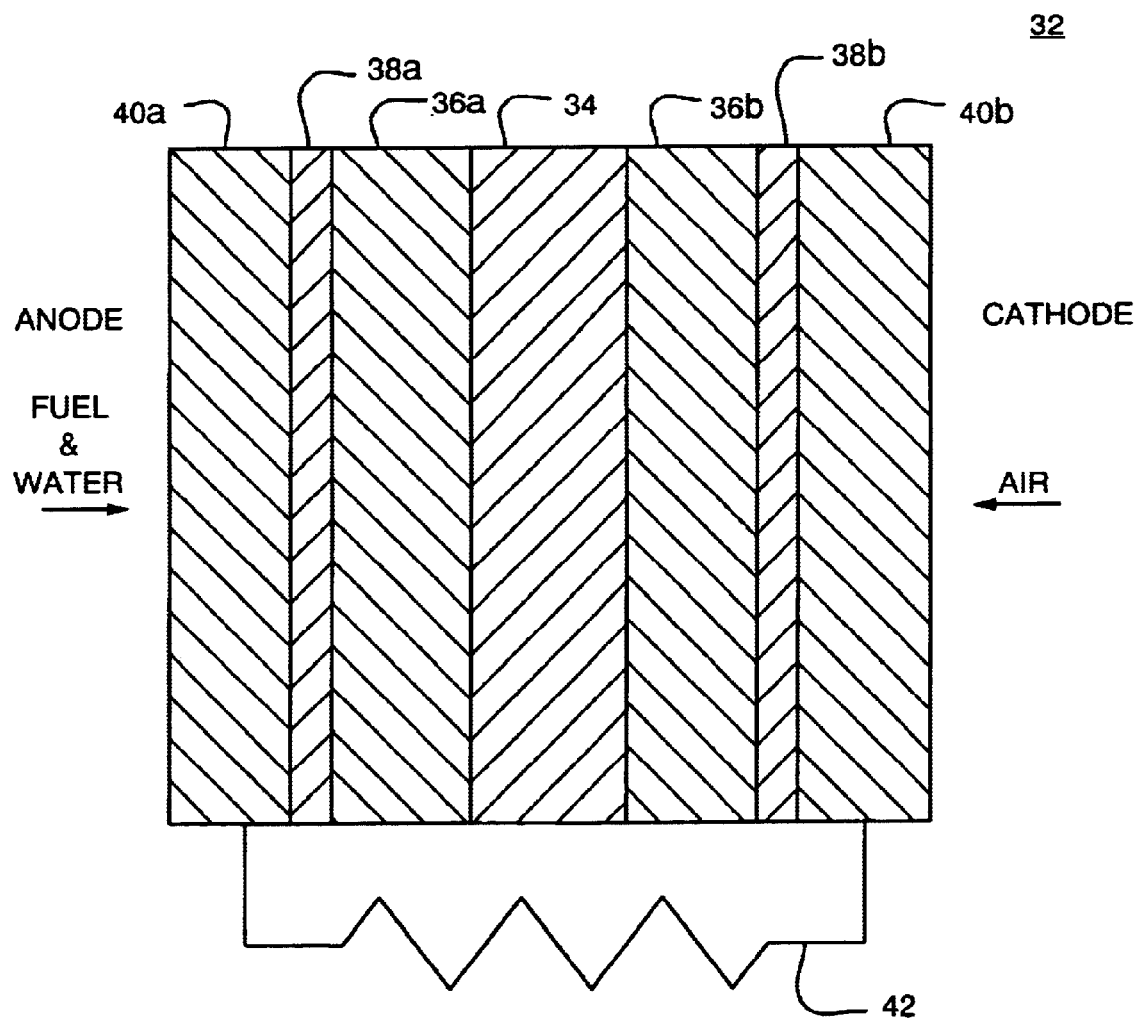
FIG. 3 is a cross-section of a membrane electrode assembly constructed in accordance with a preferred embodiment of the present invention.

FIG. 3 shows, in cross-section, a membrane electrode assembly 32 constructed in accordance with the present invention. A barrier layer 34 is sandwiched between two layers of PCM 36a, 36b. Layers of catalyst 38a, 38b are disposed on the surfaces of PCMs 36a, 36b which are not in contact with barrier layer 34. Diffusion layers 40a, 40b are disposed on the outermost surfaces of catalysts 38a, 38b. A load 42 is connected between the anode and cathode.

Barrier layer 34 is preferably constructed of a material which is substantially, if not completely, impermeable to water and fuel, but which which allows protons to pass from the anode to the cathode. For example, selected polymers such as a polyester microfilm (such as Mylar® sold by E. I. DuPont de Nemours and Company) with microperforations, a similarly treated polyimide film (such as Kapton®, also sold by E.I DuPont de Nemours and Company), present microporous structures having the desired characteristics. It should be apparent to those skilled in the art that a wide variety of materials could be used to construct the barrier layer 34.

The material used to fabricate barrier layer 34 should not be protonically conductive. Rather, the pores in the barrier layer 34 allow protonically conducting contact between PCMs 36a, 36b. The pores in barrier layer 34 need only be large enough (relative to barrier thickness) to allow PCMs 36a, 36b material contact through same, while remaining small enough to prevent the passage of liquid water, and to some extent methanol. The pores must also be close enough to one another relative to PCM thickness to minimize the increase in protonic path length.

PCMs 36a, 36b, may be constructed of conventional material as described above in connection with FIG. 2, and mechanically pressed into contact with or cast into place on barrier layer 34. Catalysts 38a, 38b and diffusion layers 40a, 40b may be constructed conventionally as discussed above.

Figure 4:
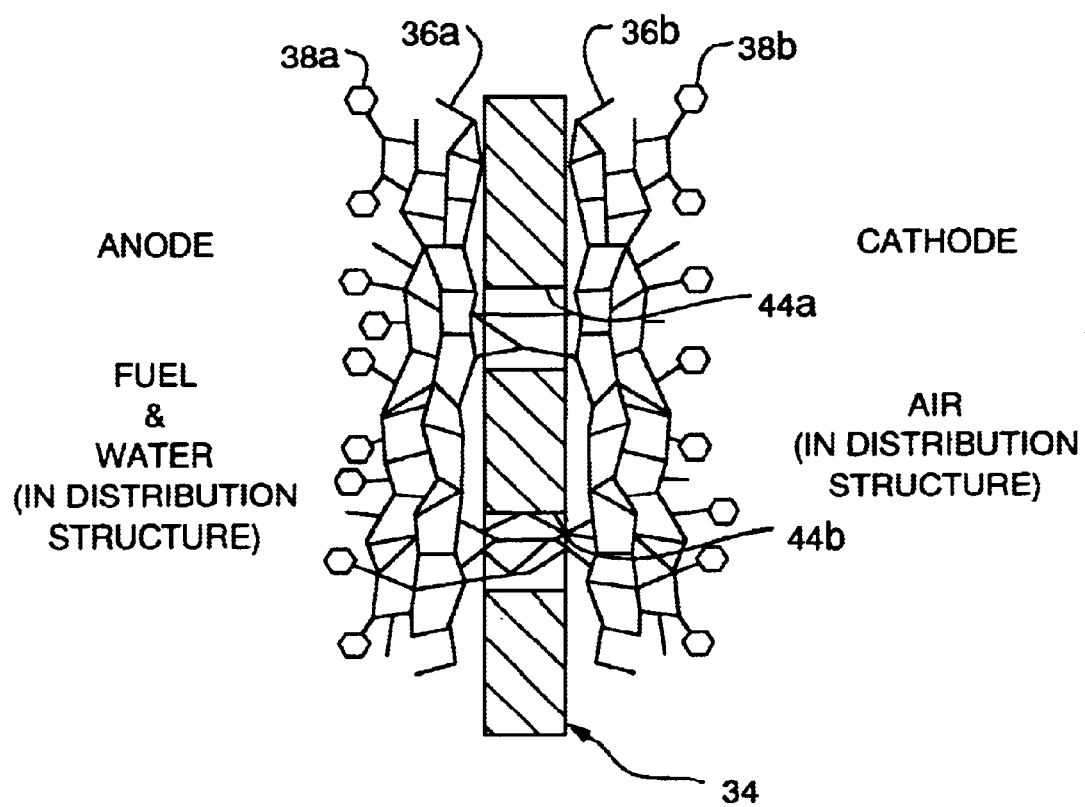
FIG. 4 is a schematic cross-section of the microscopic features of the barrier layer of FIG. 3.

As may be seen more clearly in FIG. 4, pores 44a and 44b in barrier layer 34 provide passages through which protons (not shown) may pass from anode to cathode. By effectively forcing the protons through the limited areas provided by the pores, as opposed to a larger area normally presented by a PCM, a higher density current is produced for the passage through barrier layer 34.

Figure 5A:
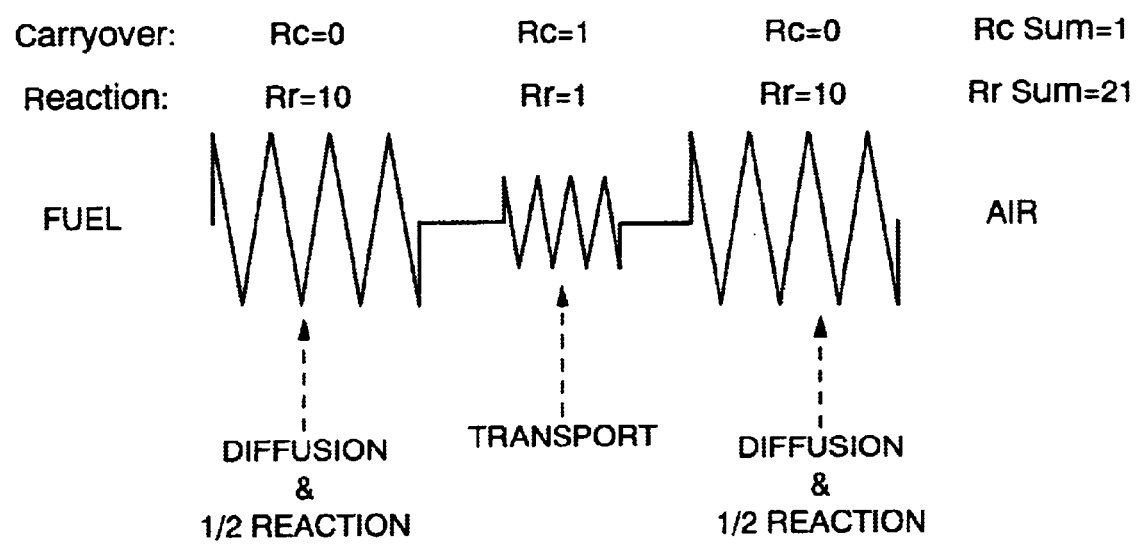
FIGS. 5A and 5B are schematic diagrams of the equivalent reaction resistances of the conventional assembly of FIG. 2 and the inventive assembly of FIG. 3, respectively.
Figure 5B:
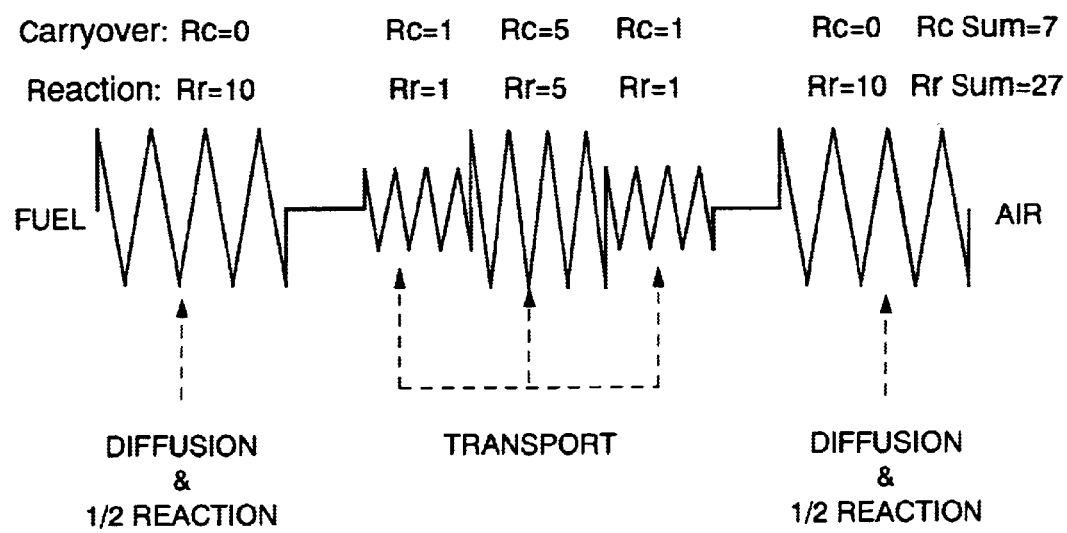

The total proton exchange process in a carbonaceous fuel cell system may be modeled as resistances in series, consisting primarily of diffusion and reaction activation portions, with relatively high resistance, and a membranecrossing portion having relatively low resistance to proton movement. Using this model, and to more fully illustrate the advantages produced by the present invention, FIGS. 5A and 5B show, respectively, illustrative estimates of the reaction and carryover (diffusion) resistances of a conventional membrane electrode assembly and the present invention. While the values shown are believed to present a valid order of magnitude comparison based on current understanding, it should be understood that these are approximations. In these Figures, resistance to carryover of water and fuel is represented by W, and the reaction resistance is represented by $R_r$. For purposes of clarity, reaction activation energy is omitted from the calculations, but this is not significant as the activation energy would be essentially the same in both calculations.

In FIG. 5A, which corresponds with the conventional MEA 30 of FIG. 2, the total carryover resistance or $R_c$ Sum=1, while the total reaction resistance or $R_r$ Sum=21. In sharp contrast, as shown in FIG. 5B, which corresponds with the inventive MEA 32 of FIG. 3, the total carryover resistance $R_c$ Sum=7, while the total reaction resistance Rr Sum=27. Thus, at a "cost" of increasing the total reaction resistance by less than 30%, the total carryover resistance has been advantageously increased by more than 85%.

It will be apparent to those skilled in the art that various substitutions or modifications may be made to the foregoing preferred embodiment of the present invention. For example, other materials which may be suitable for use as the barrier layer include Gore-Tex®.

What is claimed is:

1. A membrane electrode assembly for use in a direct oxidation fuel cell comprising:
    a barrier layer of material that is substantially protonically non-conductive and which is substantially impermeable to water and carbonaceous fuel;
    first and second protonically conductive membranes disposed, respectively, on opposite surfaces of said barrier layer;
    selected sites comprising openings providing passages through said barrier layer enabling protonically conductive contact through said passages between said first and second membranes, said passages being large enough relative to barrier layer thickness to enable the protonically conductive contact through said barrier layer, while said passages are small enough to substantially prevent the passage of liquid therethrough;
    first and second catalysts disposed, respectively, on the surfaces of said membranes which are not in contact with said barrier layer; and
    first and second diffusion material layers disposed, respectively, on the surfaces of said catalysts which are not in contact with said membranes.

2. The assembly as in claim 1 wherein said barrier layer comprises a microporous material.

3. A membrane electrode assembly for use in a direct oxidation fuel cell comprising:
    a barrier layer of material that is substantially protonically non-conductive and which is substantially impermeable to water and carbonaceous fuel, said barrier layer comprising a polyester microfilm with microperforations;
    first and second protonically conductive membranes disposed, respectively, on opposite surfaces of said barrier layer;
    a selected sites comprising openings providing passages through said barrier layer enabling protonically conductive contact through said passages between said first and to second membranes;
    first and second catalysts disposed, respectively, on the surfaces of said membranes which are not in contact with said barrier layer; and
    first and second diffusion material layers disposed, respectively, on the surfaces of said catalysts which are not in contact with said membranes.

4. A membrane electrode assembly for use in a direct oxidation fuel cell comprising:
    a barrier layer of material that is substantially protonically non-conductive and which is substantially impermeable to water and carbonaceous fuel, said barrier layer comprising a polyimide film with microperforations;
    first and second protonically conductive membranes disposed, respectively, on opposite surfaces of said barrier layer;
    selected sites comprising openings providing passages through said barrier layer enabling protonically conductive contact through said passages between said first and to second membranes;
    first and second catalysts disposed, respectively, on the surfaces of said membranes which are not in contact with said barrier layer; and
    first and second diffusion material layers disposed, respectively, on the surfaces of said catalysts which are not in contact with said membranes said barrier layer comprises a polyimide film with microperforations.

5. The assembly as in claim 1 wherein said assembly is used in a direct methanol fuel cell.

6. A layered membrane for use in a direct oxidation fuel cell comprising:
    a barrier layer of material that is substantially protonically non-conductive and which is substantially impermeable to water and carbonaceous fuel; and
    first and second protonically conductive membranes disposed, respectively, on opposite surfaces of said barrier layer; and
    selected sites comprising openings providing passages through said barrier layer enabling protonically conductive contact through said passages between said first and second membranes, said passages being large enough relative to barrier layer thickness to enable the protonically conductive contact through said barrier layer, while said passages are small enough to substantially prevent the passage of liquid therethrough.

7. The membrane as in claim 6 wherein said barrier layer comprises a microporous material.

8. A layered membrane for use in a direct oxidation fuel cell comprising:
    a barrier layer of material that is substantially protonically non-conductive and which is substantially impermeable to water and carbonaceous fuel, said barrier layer comprising a polyester microfilm with microperforations;
    first and second protonically conductive membranes disposed, respectively, on opposite surfaces of said barrier layer; and
    a selected sites comprising openings providing passages through said barrier layer enabling protonically conductive contact through said passages between said first and second membranes.

9. A layered membrane for use in a direct oxidation fuel cell comprising:
    a barrier layer of material that is substantially protonically non-conductive and which is substantially impermeable to water and carbonaceous fuel, said barrier layer comprising a polyimide film with microperforations;

first and second protonically conductive membranes disposed, respectively, on opposite surfaces of said barrier layer; and selected sites comprising opening providing passages through said barrier layer enabling protonically conductive contact through said passages between said first and second membranes.

10. The membrane as in claim 6 wherein said membrane is used in a direct methanol fuel cell.

11. A method of constructing a layered membrane for use in a direct oxidation fuel cell comprising the steps of:

providing a layer of material that is substantially protonically non-conductive and which is substantially impermeable to water and carbonaceous fuel; and providing, on opposite sides of said layer, protonically conductive membranes;

and providing sites that include passages for protons to pass through said layer which allow protonically conductive contact between said protonically conductive membranes, said passages being large enough relative to barrier layer thickness to enable the protonically conductive contact through said barrier layer, while said passages are small enough to substantially prevent the passage of liquid therethrough.

12. The method as in claim 11 wherein said layer comprises a microporous material.

13. A method of constructing a layered membrane for use in a direct oxidation fuel cell comprising the steps of:

providing a layer of material that is substantially protonically non-conductive and which is substantially impermeable to water and carbonaceous fuel, wherein said layer comprises a polyester microfilm with microperforations; and providing, on opposite sides of said layer, protonically conductive membranes; and providing sites that include passages for protons to pass through said layer which allow protonically conductive contact between said protonically conductive membranes.

14. A method of constructing a layered membrane for use in a direct oxidation fuel cell comprising the steps of:

providing a layer of material that is substantially protonically non-conductive and which is substantially impermeable to water and carbonaceous fuel, wherein said layer comprises a polyimide film with microperforations; and providing, on opposite sides of said layer, protonically conductive membranes; and providing sites that include passages for protons to pass through said layer which allow protonically conductive contact between said protonically conductive membranes.

15. A method of constructing a membrane electrode assembly for use in a direct oxidation fuel cell comprising the steps of:

providing a barrier layer of material which is substantially impermeable to water and carbonaceous fuel and which is substantially impermeable to protons;

providing, on opposite sides of said barrier layer, first and second protonically conductive membranes;

providing sites in said barrier layer which allow protonically conductive contact between said protonically conductive membranes, said passages being large enough relative to barrier layer thickness to enable the protonically conductive contact through said barrier layer, while said passages are small enough to substantially prevent the passage of liquid therethrough; and providing, on the surfaces of said membranes which are not in contact with said layer, first and second catalyst layers; and providing, on the surfaces of said first and second catalyst layers which are not in contact with said membranes, first and second distribution layers.

16. The method as in claim 15 wherein said barrier layer comprises a microporous material.

17. A method of constructing a membrane electrode assembly for use in a direct oxidation fuel cell comprising the steps of:

providing a barrier layer of material which is substantially impermeable to water and carbonaceous fuel and which is substantially impermeable to protons, said barrier layer comprising a polyester microfilm with microperforations;

providing, on opposite sides of said barrier layer, first and second protonically a conductive membranes; and providing sites in said barrier layer which allow protonically conductive contact to between said protonically conductive membranes.

18. A method of constructing a membrane electrode assembly for use in a direct oxidation fuel cell comprising the steps of:

providing a barrier layer of material which is substantially impermeable to water and carbonaceous fuel and which is substantially impermeable to protons, said barrier layer comprises a polyimide film with microperforations;

providing, on opposite sides of said barrier layer, first and second protonically a conductive membranes; and providing sites in said barrier layer which allow protonically conductive contact to between said protonically conductive membranes.

19. A direction oxidation fuel cell comprising:

an anode;

a cathode;

a membrane electrode assembly, said assembly including a barrier layer of material that is substantially protonically non-conductive and which is substantially impermeable to water and fuel, first and second protonically conductive membranes disposed, respectively, on opposite surfaces of said barrier layer, said barrier layer having sites in said barrier layer that allow protonically conductive contact between said membranes, said passages being large enough relative to barrier layer thickness to enable the protonically conductive contact through said barrier layer, while said passages are small enough to substantially prevent the passage of liquid therethrough first and second catalysts disposed, respectively, on the surfaces of said membranes which are not in contact with said layer, and first and second diffusion material layers disposed, respectively, on the surfaces of said catalysts which are not in contact with said membranes; and a housing in which said anode, cathode and assembly are disposed.

20. The fuel cell as in claim 19 wherein said barrier layer comprises a microporous material.

21. A direction oxidation fuel cell comprising:

an anode;

a cathode;

a membrane electrode assembly, said assembly including a barrier layer of material that is substantially protonically non-conductive and which is substantially impermeable to water and fuel, said barrier layer comprising a polyester microfilm with microperforations, first and second protonically conductive membranes disposed, respectively, on opposite surfaces of said barrier layer, said barrier layer having sites in said barrier layer that allow protonically conductive contact between said membranes, said passages being large enough relative to barrier layer thickness to enable the protonically conductive contact through said barrier layer, while said passages are small enough to substantially prevent the passage of liquid therethrough first and second catalysts disposed, respectively, on the surfaces of said membranes which are not in contact with said layer, and first and second diffusion material layers disposed, respectively, on the surfaces of said catalysts which are not in contact with said membranes; and a housing in which said anode, cathode and assembly are disposed.

22. A direction oxidation fuel cell comprising:

an anode;

a cathode;

a membrane electrode assembly, said assembly including a barrier layer of material that is substantially protonically non-conductive and which is substantially impermeable to water and fuel, said barrier layer comprises a polyimide film with microperforations, first and second protonically conductive membranes disposed, respectively, on opposite surfaces of said barrier layer, said barrier layer having sites in said barrier layer that allow protonically conductive contact between said membranes, said passages being large enough relative to barrier layer thickness to enable the protonically conductive contact through said barrier layer, while said passages are small enough to substantially prevent the passage of liquid therethrough, first and second catalysts disposed, respectively, on the surfaces of said membranes which are not in contact with said layer, and first and second diffusion material layers disposed, respectively, on the surfaces of said catalysts which are not in contact with said membranes; and a housing in which said anode, cathode and assembly are disposed.

23. The fuel cell as in claim 22 wherein said fuel cell is a direct methanol fuel cell.

* * * * *